(12) United States Patent
Kamimura et al.

(10) Patent No.: US 8,471,950 B2  
(45) Date of Patent: Jun. 25, 2013

(54) SIGNAL PROCESSOR FOR ADJUSTING IMAGE QUALITY OF AN INPUT PICTURE SIGNAL

(75) Inventors: Junji Kamimura, Yokohama (JP); Akihito Nishizawa, Yokosuka (JP); Junji Shiokawa, Chigasaki (JP); Shinichi Nonaka, Zushi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 617 days.

(21) Appl. No.: 12/621,304

(22) Filed: Nov. 18, 2009

(65) Prior Publication Data  
US 2010/0134649 A1 Jun. 3, 2010

(30) Foreign Application Priority Data  
Nov. 28, 2008 (JP) ................... 2008-303423

(51) Int. Cl.  
*H04N 5/335* (2006.01)  
*H04N 9/28* (2006.01)

(52) U.S. Cl.  
USPC ............ 348/348; 348/345; 348/349; 382/173

(58) Field of Classification Search  
USPC ............ 348/229.1, 230.1, 345–357; 382/164, 382/171, 173–180  
See application file for complete search history.

(56) References Cited

U.S. PATENT DOCUMENTS

| | | | | |
|---|---|---|---|---|
| 5,978,027 | A * | 11/1999 | Takeda | 348/348 |
| 2001/0028402 | A1* | 10/2001 | Sugimoto et al. | 348/345 |
| 2002/0080247 | A1* | 6/2002 | Takahashi et al. | 348/229 |
| 2003/0002732 | A1* | 1/2003 | Gossett et al. | 382/164 |
| 2004/0169767 | A1* | 9/2004 | Norita et al. | 348/350 |
| 2005/0157189 | A1* | 7/2005 | Sambongi | 348/241 |
| 2006/0087578 | A1* | 4/2006 | Hong et al. | 348/333.01 |

* cited by examiner

*Primary Examiner* — John Villecco  
*Assistant Examiner* — Dwight C Tejano  
(74) *Attorney, Agent, or Firm* — Kilpatrick Townsend & Stockton LLP (57) ABSTRACT

A signal processor capable of extracting evaluated values used for automatic control more appropriately, including: a feature detection unit which detects a feature change position of any target pixel and its peripheral pixels in an input picture signal; a hold unit which holds the position information; a region creation unit which creates a region by excluding the held positions from an evaluated value extraction region; and an evaluated value extraction unit which extracts evaluated values in accordance with the region; wherein unnecessary portions different in feature from the periphery are extracted in accordance with any pixel unit by detection of the feature change position so that the feature change position is excluded from the evaluated value extraction region.

15 Claims, 12 Drawing Sheets

SIGNAL PROCESSOR FOR ADJUSTING IMAGE QUALITY OF AN INPUT PICTURE SIGNAL

BACKGROUND OF THE INVENTION

1. Field of the Invention

The present invention relates to a signal processor. For example, it is concerned with an automatic control system in an apparatus such as a video camera, a digital still camera, etc.

2. Description of the Background Art

JP-A-6-14236 has described an object "to obtain safe and accurate focusing information from an image region (ranging frame) with exposure most suitable for AF and without high luminance" and use of a solution "a system control circuit changes an image region for detection of a focusing lens position when a high luminance detection circuit detects a high luminance portion".

In the signal processor according to the background art, when there is a high luminance portion in a focusing lens position detection region currently selected, the region is changed. However, the change of the region is not performed after the absence of the high luminance portion in the changed region is confirmed, that is, a process of confirming the absence of the high luminance portion in the region is performed after the region is changed. Therefore, when there are a plurality of high luminance portions, there is a problem that it is necessary to repeat the change of the region and the process of confirming the absence of the high luminance portion.

In a method in which a plurality of focusing lens position detection regions are prepared so that an optimum one is extracted from the regions, there is a possibility that a high luminance portion may exist in any region in accordance with the size of each region, the size of each high luminance portion, the position of each high luminance portion and the number of high luminance portions. Therefore, there is a problem that there may be no optimum region.

However, the aforementioned problems have not been described in JP-A-6-14236.

SUMMARY OF THE INVENTION

The problems are improved by the configuration described in the scope of claims by way of example.

The invention can provide a signal processor, for example, which can extract an evaluated value used for automatic control more appropriately.

DETAILED DESCRIPTION OF THE INVENTION

Figure 1:
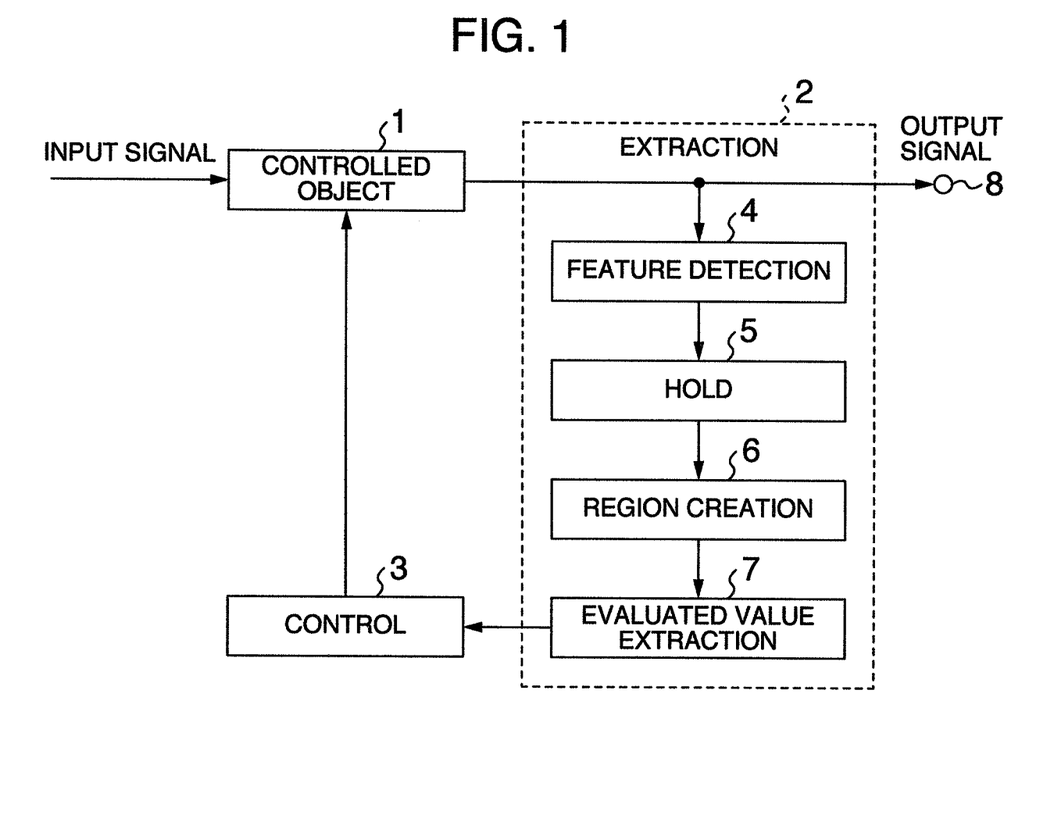
FIG. 1 is a diagram for explaining Embodiment 1.
Figure 2:
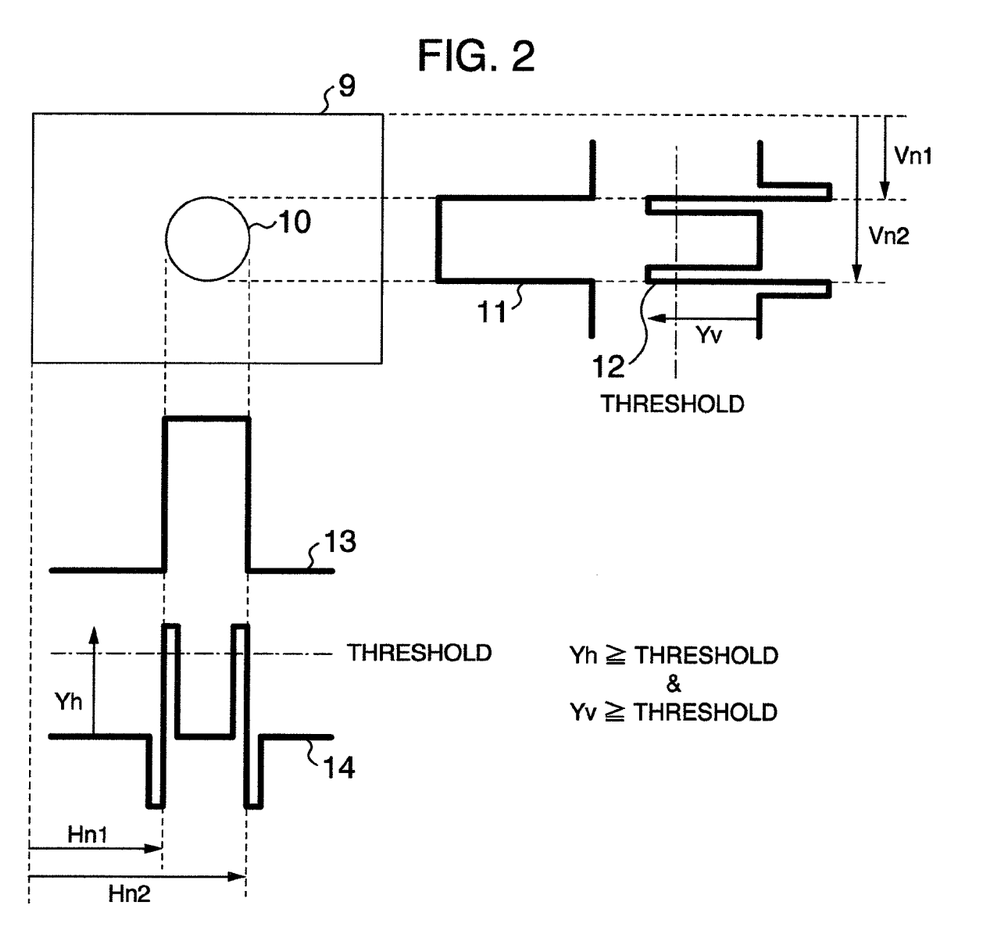
FIG. 2 is a view for explaining the operation of a feature detection unit.
Figure 3:
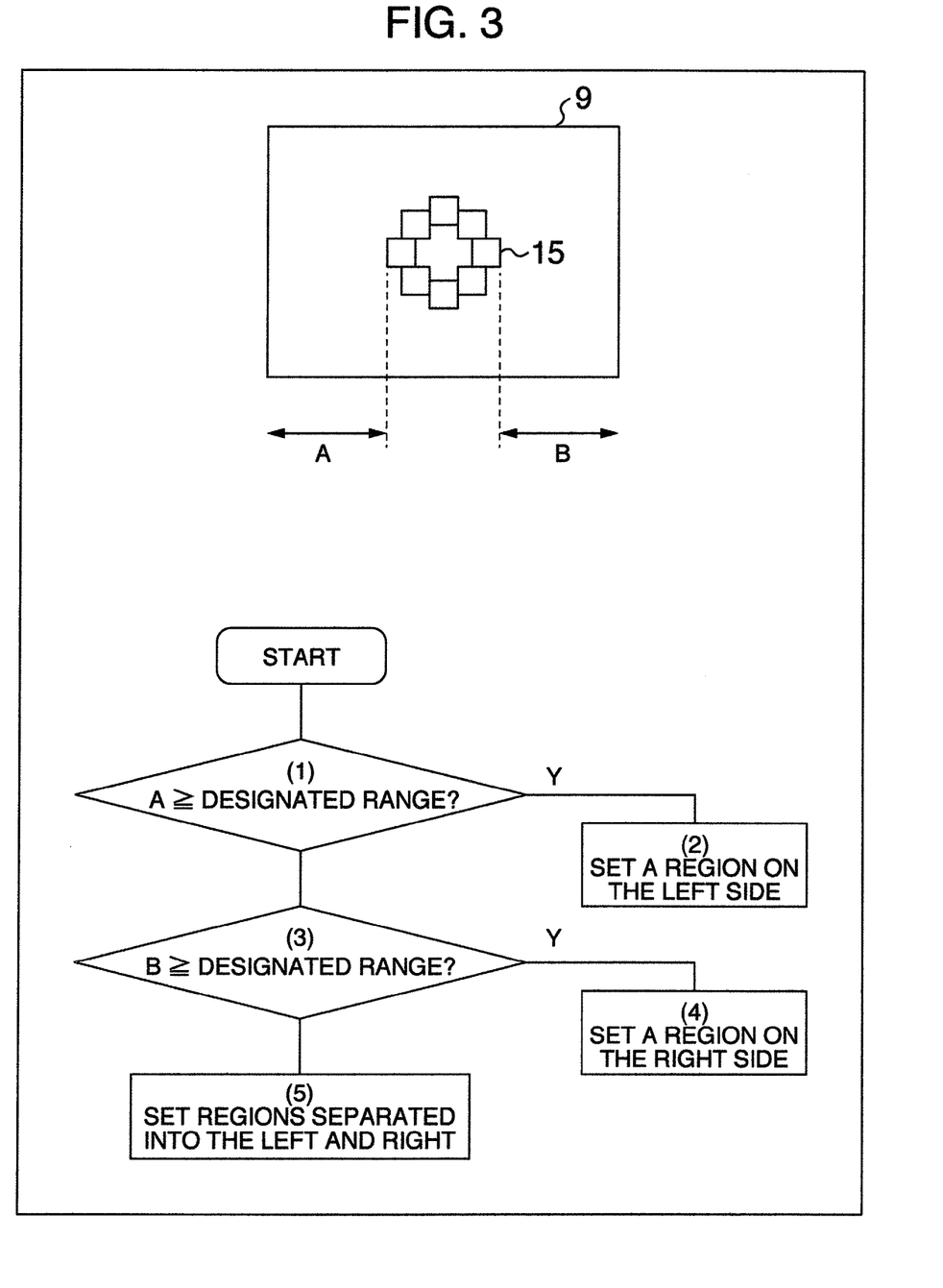
FIG. 3 is a view for explaining the operation of a region creation unit.
Figure 4:
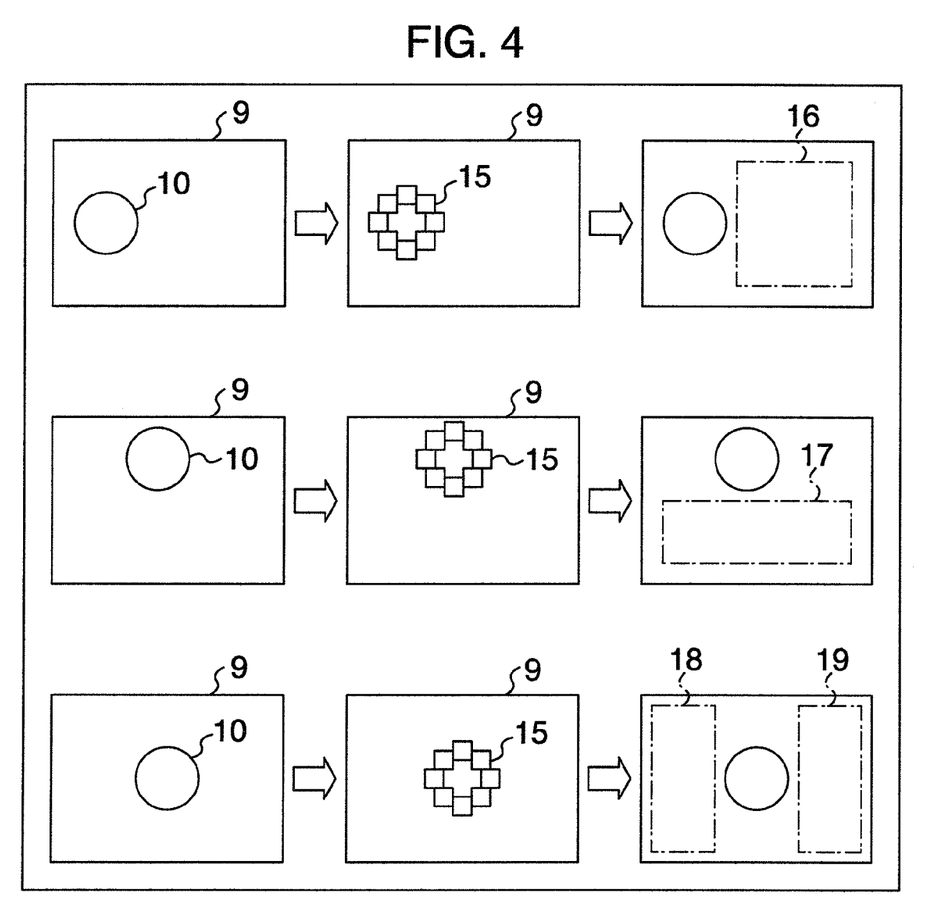
FIG. 4 is a view for explaining the operation of the region creation unit.
Figure 5:
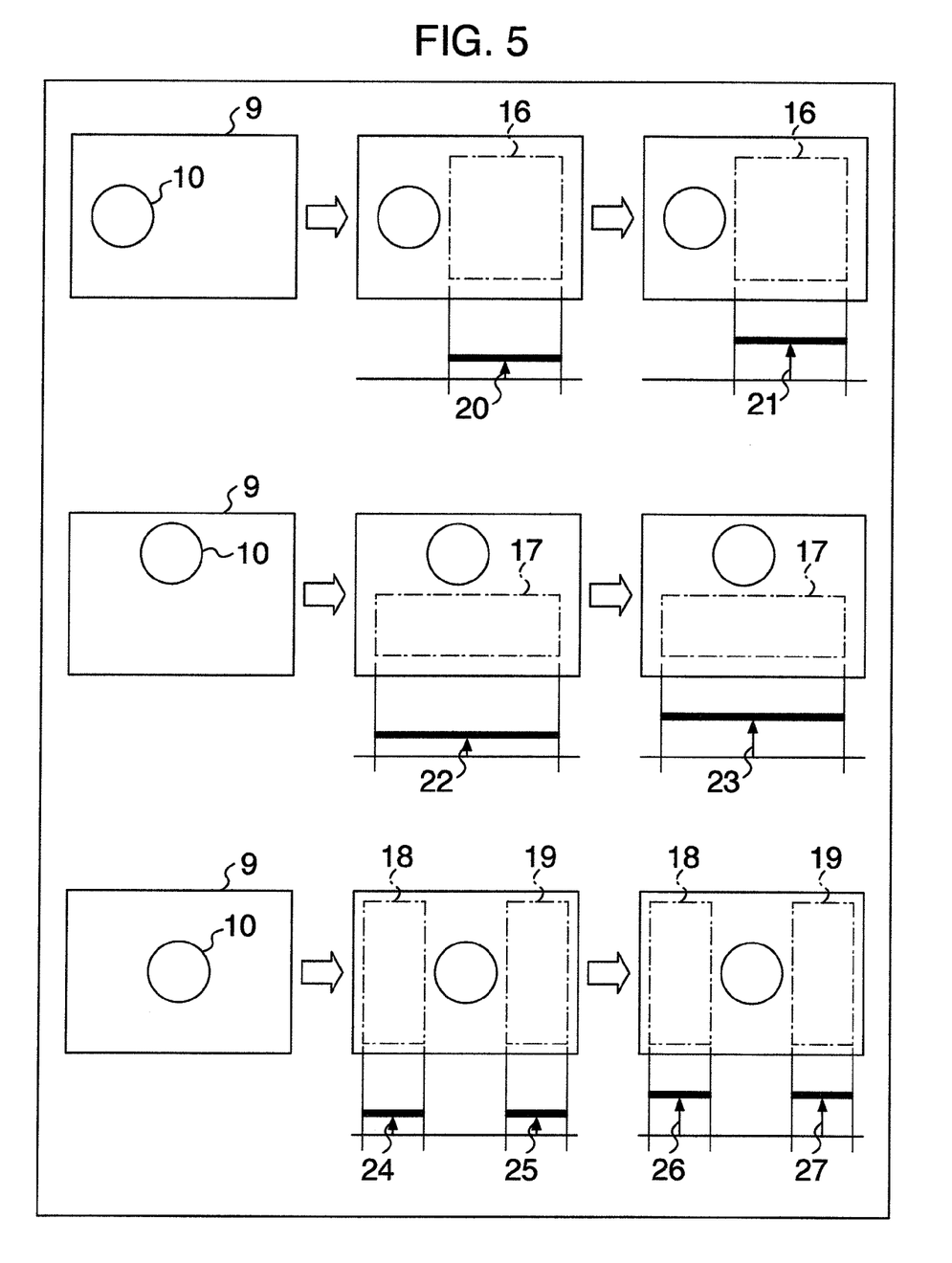
FIG. 5 is a view showing evaluated value extraction in a changed region.

Embodiments of the invention will be described below.
[Embodiment 1]
Embodiment 1 will be described with reference to FIGS. 1, 2, 3, 4 and 5. FIG. 1 is a diagram showing an example of a signal processor according to the invention. FIG. 2 is a view for explaining a method of extracting a pixel position where feature changes. FIG. 3 is a view for explaining the operation of a region creation unit. FIG. 4 is a view showing a state in which a region is changed. FIG. 5 is a view showing evaluated value extraction in a changed region.

In FIG. 1, the reference numeral 1 designates a processing unit which performs processing to adjust the image quality of an input picture signal; 2, an extraction unit which extracts evaluated values of the input picture signal; 3, a control unit which controls the degree of adjustment of the processing unit in accordance with the evaluated values output from the extraction unit; 4, a feature detection unit which detects a position where features of any target pixel and its peripheral signal in the input picture signal change; 5, a hold unit which holds the position information; 6, a region creation unit which creates a region by removing the held positions from the evaluated value extraction region; 7, an evaluated value extraction unit which extracts an evaluated value in accordance with the region; and 8, an output terminal which outputs a picture signal to a subsequent stage. Connection will be described. The input picture signal is connected to an input of the processing unit 1. An output of the processing unit 1 is connected to an input of the feature detection unit 4 and the output terminal 8. An output of the feature detection unit 4 is connected to an input of the hold unit 5. An output of the hold unit 5 is connected to an input of the region creation unit 6. An output of the region creation unit 6 is connected to an input of the evaluated value extraction unit 7. An output of the evaluated value extraction unit 7 is connected to an input of the control unit 3. An output of the control unit 3 is connected to an input of the processing unit 1.

In FIG. 2, the reference numeral 9 designates an effective picture signal in the input picture signal; 10, a spotlight (e.g. in the case of a picture signal in which a point light source is reflected in a dark place) component existing in the effective picture signal 9; 11, a vertical signal intensity distribution of the effective picture signal 9 viewed vertically; 12, a vertical differential result obtained by applying a differentiating process to the signal intensity distribution 11; 13, a horizontal signal intensity distribution of the effective picture signal 9 viewed horizontally; and 14, a horizontal differential result obtained by applying a differentiating process to the signal intensity distribution 13.

In FIG. 3, the reference numeral 15 designates a position information indicator which indicates the position information held by the hold unit on the effective picture signal 9. In FIG. 3, the flow chart shows a flow of processing in the case where the region creation unit 6 determines a region.

In FIG. 4, the reference numeral 16 designates a region which is created by the region creation unit 6 when there is the spotlight 10 at the left end of the effective picture signal 9; 17, a region which is created by the region creation unit 6 when there is the spotlight 10 at the upper end of the effective picture signal 9; and 18 and 19, two regions which are created by the region creation unit 6 when there is the spotlight 10 in the center of the effective picture signal 9.

In FIG. 5, the reference numerals 9 and 10 designate an effective picture signal and a spotlight like those shown in FIGS. 2; and 16, 17, 18 and 19, regions like those shown in FIG. 4. The reference numeral 20 designates an evaluated value extracted in the region 16; 21, an evaluated value after the control unit 3 controls the processing unit 1 to increase signal intensity in response to the evaluated value 20; 22, an evaluated value extracted in the region 17; 23, an evaluated value after the control unit 3 controls the processing unit 1 to increase signal intensity in response to the evaluated value 22; 24, an evaluated value extracted in the region 18; 25, an evaluated value after the control unit 3 controls the processing unit 1 to increase signal intensity in response to the evaluated value 24; 26, an evaluated value extracted in the region 19; and 27, an evaluated value after the control unit 3 controls the processing unit 1 to increase signal intensity in response to the evaluated value 26.

Operation will be described. In FIG. 1, when a picture signal is input, a position where feature changes is detected by the feature detection unit 4. Description will be made here by use of the example where a feature change position is detected by differentiation of signal intensity of a target pixel and signal intensity of left and right adjacent pixels. As shown in FIG. 2, when there is a spotlight 10 on an effective picture signal 9, signal intensity changes suddenly as represented by the horizontal signal intensity distribution 13 so that an image different in feature from the periphery is obtained. When a process of calculating differentiation of signal intensity of a target pixel and signal intensity of left and right adjacent pixels is applied to the horizontal signal intensity distribution 13, a waveform as represented by the horizontal differential result 14 is obtained. On this occasion, when the differential value exceeds a threshold set in advance, the spotlight 10 is excluded from an evaluated value extraction region. On this occasion, the hold unit 5 (FIG. 1) holds positions Hn1 and Hn2 distant from the left end of the effective picture signal 9 as feature change positions. Similarly as shown in FIG. 2, vertical signal intensity changes suddenly as represented by the vertical signal intensity distribution 11 so that an image different in feature from the periphery is obtained. When a process of calculating differentiation of signal intensity of a target pixel and signal intensity of upper and lower adjacent pixels is applied to the vertical signal intensity distribution 11, a waveform as represented by the vertical differential result 12 is obtained. On this occasion, when the differential value exceeds a threshold set in advance, the spotlight 10 is excluded from an evaluated value extraction region. On this occasion, the hold unit 5 (FIG. 1) holds positions Vn1 and Vn2 distant from the upper end of the effective picture signal 9 as feature change positions. When this operation is applied to all pixels of the effective picture signal 9, the hold unit 5 (FIG. 1) holds positions where the spotlight 10 is fringed as represented by the position information indicator 15 shown in FIG. 3.

The region creation unit 6 (FIG. 1) performs an operation shown in the flow chart of FIG. 3 in order to exclude the position information indicator 15 (FIG. 3) from the evaluated value extraction region. When a region (A) on the left side of the position information indicator 15 is not smaller than the evaluated value extraction region designated in advance (step 1), the evaluated value extraction region is set in the region (A) on the left side of the position information indicator 15 (step 2). When the region (A) on the left side of the position information indicator 15 is smaller but a region (B) on the right side of the position information indicator 15 is not smaller than the evaluated value extraction region designated in advance (step 3), the evaluated value extraction region is set in the region (B) on the right side of the position information indicator 15 (step 4). When each of the region (A) on the left side and the region (B) on the right side is smaller than the evaluated value extraction region designated in advance, the evaluated value extraction region is divided into two to be set in the region (A) on the left side and the region (B) on the right side, respectively (step 5). As a result, the region in the horizontal direction is determined. The same operation is performed also in the vertical direction so that the region in the vertical direction is determined. In this manner, a frame of the region is determined. As shown in FIG. 5, the region 16 is a frame of the region when the spotlight 10 is at the left end of the effective picture signal 9, the region 17 is a frame of the region created by the region creation unit 6 when the spotlight 10 is at the upper end of the effective picture signal 9, and the regions 18 and 19 are frames of the two regions created by the region creation unit 6 when the spotlight 10 is in the center of the effective picture signal 9. When the regions 16, 17, 18 and 19 thus determined are used so that the evaluated value extraction unit 7 extracts evaluated values by a commonly known method of integrating signal intensity of all pixels, for example, in each of the regions, evaluated values 20, 22, 24 and 25 can be detected consequently without any influence of the spotlight 10. Here, the control unit 3 controls the processing unit 1 to adjust signal intensity. An example of control to increase signal intensity will be described here. When evaluated value extraction is performed again by using the regions 16, 17, 18 and 19 based on a result of the control unit 3's controlling the processing unit 1 to increase signal intensity, evaluated values 21, 23, 26 and 27 are obtained consequently.

By the aforementioned operation, evaluated values without influence of the spotlight can be extracted because the position of the spotlight is excluded from the evaluated value extraction range even when there is the spotlight in the effective picture signal.

Moreover, the feature detection unit and the hold unit for holding the positions of pixels having a feature are provided so that a process of calculating an evaluated value of a place where pixels having a feature are excluded can be performed by using a result of detection/holding of positions of pixels having the feature. Accordingly, this embodiment is more excellent in processing efficiency than the method in which an image region is divided into a plurality of regions and evaluated values of the regions are calculated in advance so that an optimum one is selectively used from the evaluated values of the regions. This embodiment is effective in reduction of power consumption when this embodiment is achieved by an electronic circuit or the like. This embodiment can be easily achieved by software because it is not necessary to provide any process of calculating extra evaluated values when the aforementioned processing is achieved in the case where real time processing for motion pictures or the like is required.

[Embodiment 2]

Figure 6:
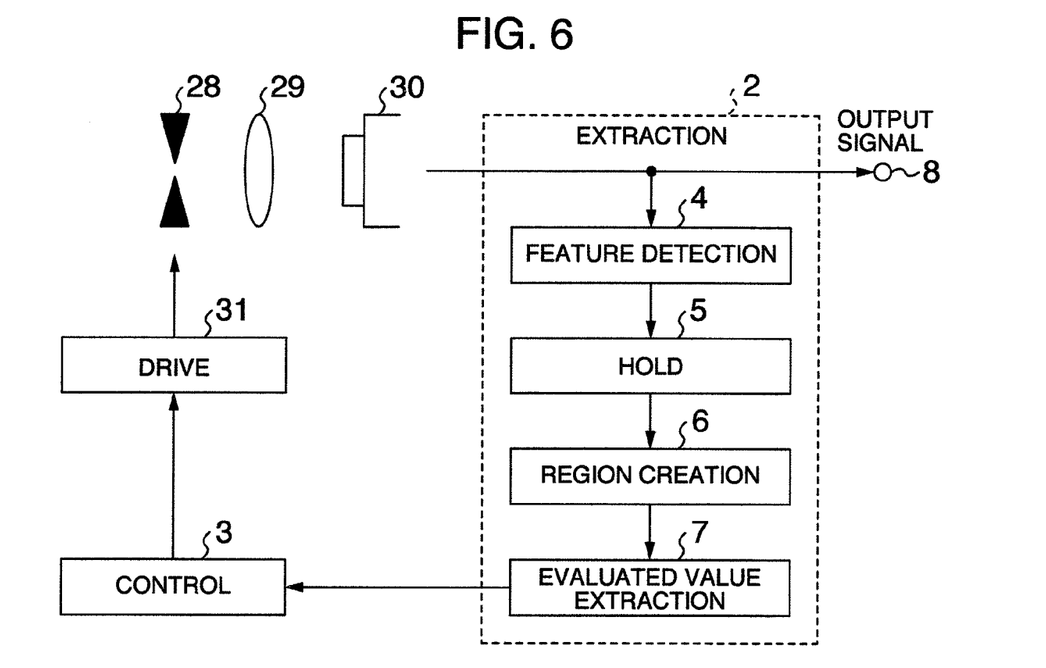
FIG. 6 is a diagram for explaining Embodiment 2.

Embodiment 2 will be described with reference to FIG. 6. FIG. 6 shows an image pickup apparatus represented by a movie camera or a digital still camera. In FIG. 6, the reference numeral 28 designates a light intensity adjustment unit for controlling exposure; 29, a lens for collecting light; 30, a photoelectric conversion unit for performing photoelectric conversion in accordance with an image formed on a photo acceptance surface by the lens 29; and 31, a drive unit for driving the light intensity adjustment unit 28. With respect to connection, the light intensity adjustment unit 28 is disposed in front of the lens 29, the photoelectric conversion unit 30 is disposed in the rear of the lens 29, and a picture signal output from the photoelectric conversion unit 30 is input to the extraction unit 2. An output of the control unit 3 is input to the drive unit 31. The drive unit 31 is connected so that the light intensity adjustment unit 28 can be adjusted. Other connections are the same as in Embodiment 1 shown in FIG. 1.

Operation will be described. The feature detection unit 4, the hold unit 5, the region creation unit 6 and the evaluated value extraction unit 7 included in the extraction unit 2 operate in the same manner as in Embodiment 1 shown in FIG. 1 and description thereof will be omitted. Light with light intensity adjusted by the light intensity adjustment unit 28 is converged on a photo acceptance surface of the photoelectric conversion unit 30 and converted into an electric signal serving as a picture signal. An evaluated value extraction region in which a feature change position of any target pixel and its peripheral signal is excluded is determined by the aforementioned operation of the extraction unit 2, so that a result of evaluated value extraction in the extraction region is obtained. The control unit 3 compares the extracted evaluated value with a reference value based on the result, determines control to increase light intensity when the evaluated value is smaller than the reference value and decrease light intensity when the evaluated value is not smaller than the reference value, and issues a command to the drive unit 31. The drive unit 31 adjusts light intensity in accordance with the command.

By the aforementioned operation, even when there is a spotlight in the effective picture signal, the evaluated value not affected by the spotlight can be extracted because the position of the spotlight is excluded from the evaluated value extraction region. It is possible to solve the problem which has been described in the background art and in which a barrier to optimum light intensity adjustment is brought so that other places than the spotlight 10 are sunk darkly because the evaluated value is too large when there is a spotlight in the evaluated value extraction region so that the control unit 3 issues a command to the light intensity adjustment unit 28 to decrease total signal intensity.

[Embodiment 3]

Figure 7:
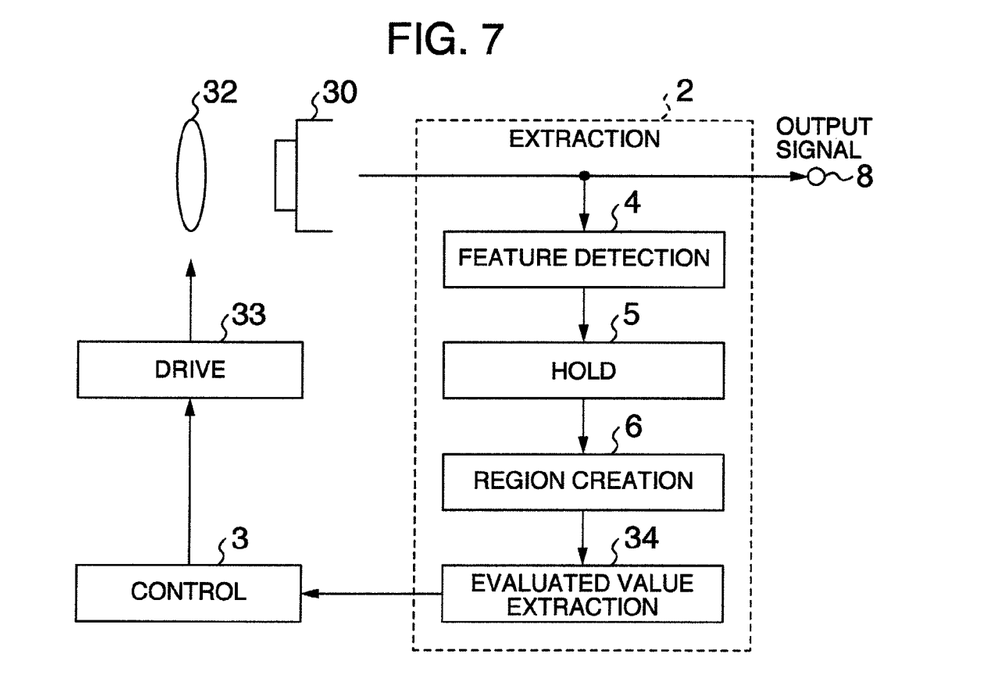
FIG. 7 is a diagram for explaining Embodiment 3.
Figure 8:
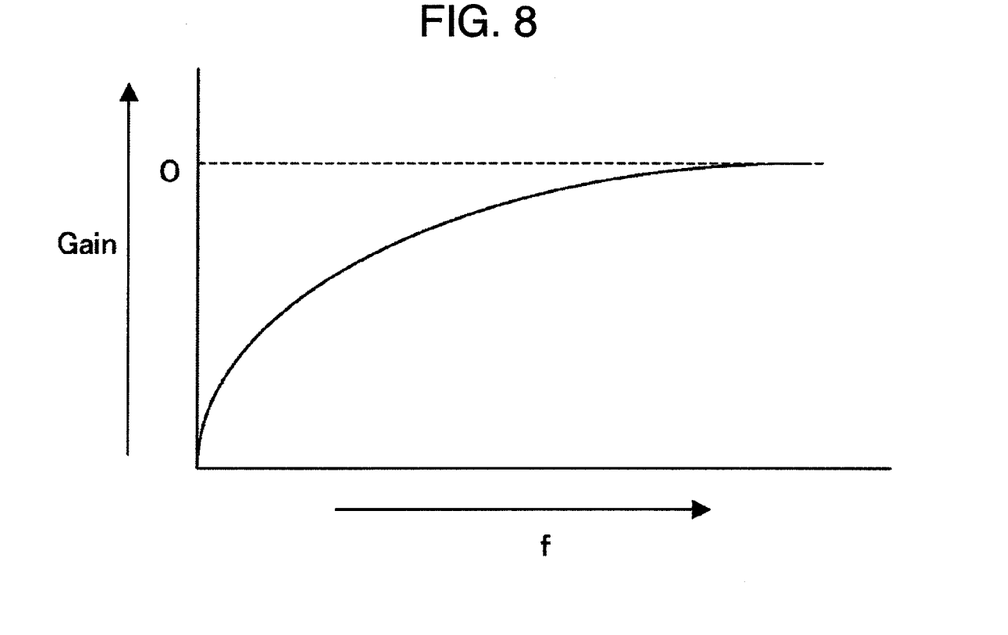
FIG. 8 is a graph showing an example of characteristic of HPF.
Figure 9:
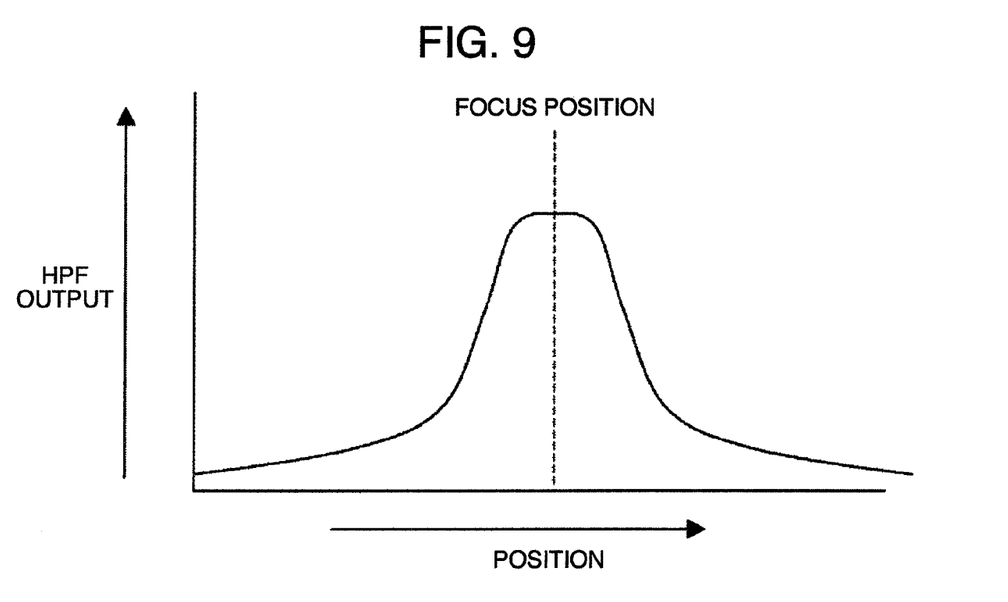
FIG. 9 is a graph showing the relation between the position of a focus lens and the HPF output shown in FIG. 8.

Embodiment 3 will be described with reference to FIGS. 7, 8 and 9. FIG. 7 shows an image pickup apparatus represented by a movie camera or a digital still camera. In FIG. 7, the reference numeral 32 designates a focus lens having a focusing unit for adjusting the focus of the lens in order to condense light; 33, a focus lens drive unit for driving the focusing unit of the focus lens 32; and 34, an auto-focus evaluated value extraction unit for extracting an evaluated value necessary for auto focusing. FIG. 8 shows an example of characteristic of a high pass filter (hereinafter referred to as HPF) included in the auto-focus evaluated value extraction unit 34. FIG. 9 is a graph showing the relation between the position of the focus lens and the output of the HPF shown in FIG. 8. In FIG. 9, the vertical broken line in the center shows a focusing position.

With respect to connection, the photoelectric conversion unit 30 is disposed in the rear of the lens 32, and a picture signal output from the photoelectric conversion unit 30 is input to the extraction unit 2. An output of the control unit 3 is input to the focus lens drive unit 33. The focus lens drive unit 33 is connected so that the focus of the focus lens 32 can be adjusted. Other connections are the same as in Embodiment 1 shown in FIG. 1.

Operation will be described. The feature detection unit 4, the hold unit 5 and the region creation unit 6 included in the extraction unit 2 operate in the same manner as in Embodiment 1 shown in FIG. 1 and description thereof will be omitted. The auto-focus evaluated value extraction unit 34 has a plurality of HPFs. As shown in FIG. 8 which shows an example of characteristic of an HPF, only a high-frequency component in frequency components of a picture signal passes through the HPF so that the frequency components are attenuated as the frequency becomes lower. Because focusing means the presence of a large amount of high-frequency component in the picture signal, the output of the HPF is maximized at a focusing point as shown in FIG. 9. The auto-focus evaluated value extraction unit 34 outputs the output of the HPF as an evaluated value.

An evaluated value extraction region in which a feature change position of any target pixel and its peripheral signal is excluded is determined by the aforementioned operation of the extraction unit 2, so that a result of extraction of an evaluated value in the extraction region is obtained. The control unit 3 issues a command to the focus lens drive unit 33 based on the result to move back or forth the position of the focus lens 32 to specify the position of the focus lens 32 where the evaluated value is maximized. The focus lens drive unit 33 moves back or forth the focus lens 32 in accordance with the command.

By the aforementioned operation, even when there is a spotlight in the effective picture signal, the evaluated value not affected by the spotlight can be extracted because the position of the spotlight is excluded from the evaluated value extraction region. It is possible to solve the problem which has been described in the background art and in which a barrier to optimum light intensity adjustment is brought because the evaluated value of the other position than the focusing point is too large when there is a spotlight in the evaluated value extraction region.

[Embodiment 4]

Figure 10:
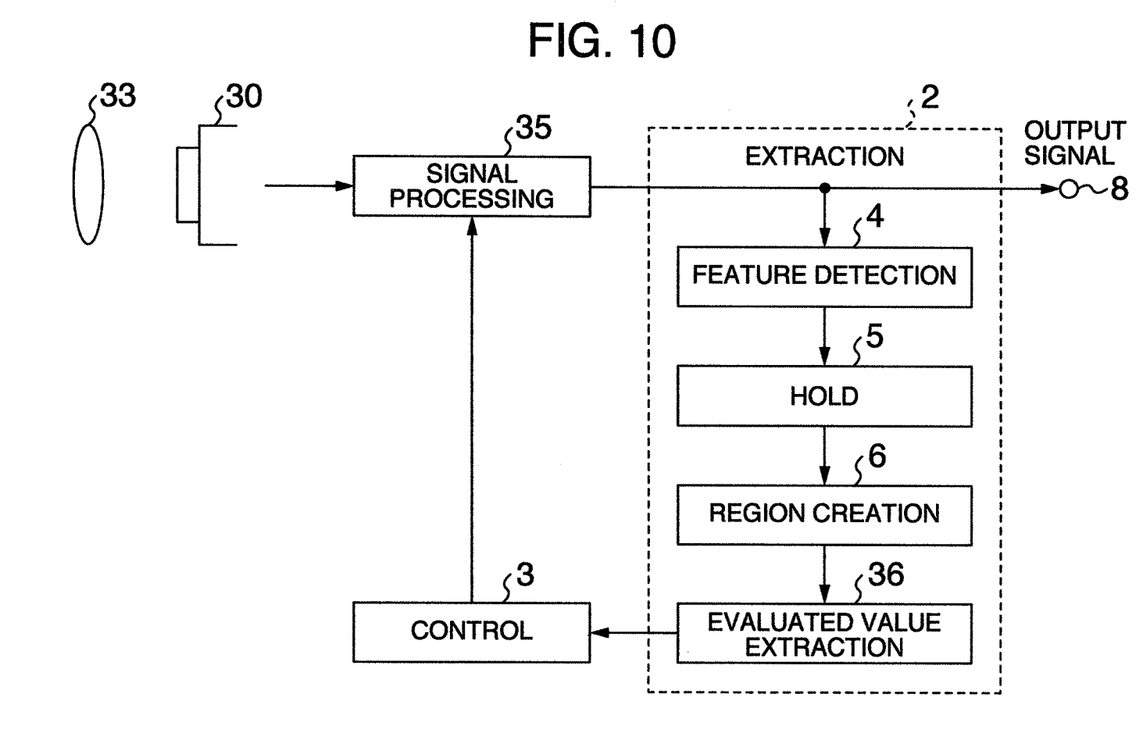
FIG. 10 is a diagram for explaining Embodiment 4 in which signal processing is a target to be controlled.

Embodiment 4 will be described with reference to FIG. 10. In FIG. 10, the reference numeral 35 designates a signal processing unit which performs a general picture signal generating process while adjusting white balance of a signal output from the photoelectric conversion unit 30. The reference numeral 36 designates a white balance evaluated value extraction unit which extracts an evaluated value necessary for the signal processing unit 35 to adjust white balance. Other numerals are the same as in the aforementioned embodiments.

Operation will be described. The feature detection unit 4, the hold unit 5 and the region creation unit 6 included in the extraction unit 2 operate in the same manner as in the aforementioned embodiments. The white balance evaluated value extraction unit 36 extracts an evaluated value necessary for white balance from the region created by the region creation unit 6 as described above and outputs the extraction result to the control unit 3. For example, the white balance evaluated value extraction unit 36 sets a white component range of an image by determining a white component from color signals generated by the picture signal generating process and extracts and differentiates the color signals contained in the white component range to thereby detect a white balance difference and output the white balance difference as a result. Upon reception of the result, the control unit 3 controls the signal processing unit 35 to adjust white balance. For example, the control unit 3 controls gains of color signals such as a primary color signal R (red), a primary color signal B (blue), etc. in the picture signal generating process based on the result of detection of the white balance difference.

By the aforementioned operation, even when there is a spotlight in the effective picture signal, an evaluated value not affected by the spotlight can be extracted because the position of the spotlight is excluded from the evaluated value extraction region. Accordingly, the problem of the white balance difference caused by the spotlight can be solved.

[Embodiment 5]

Figure 11:
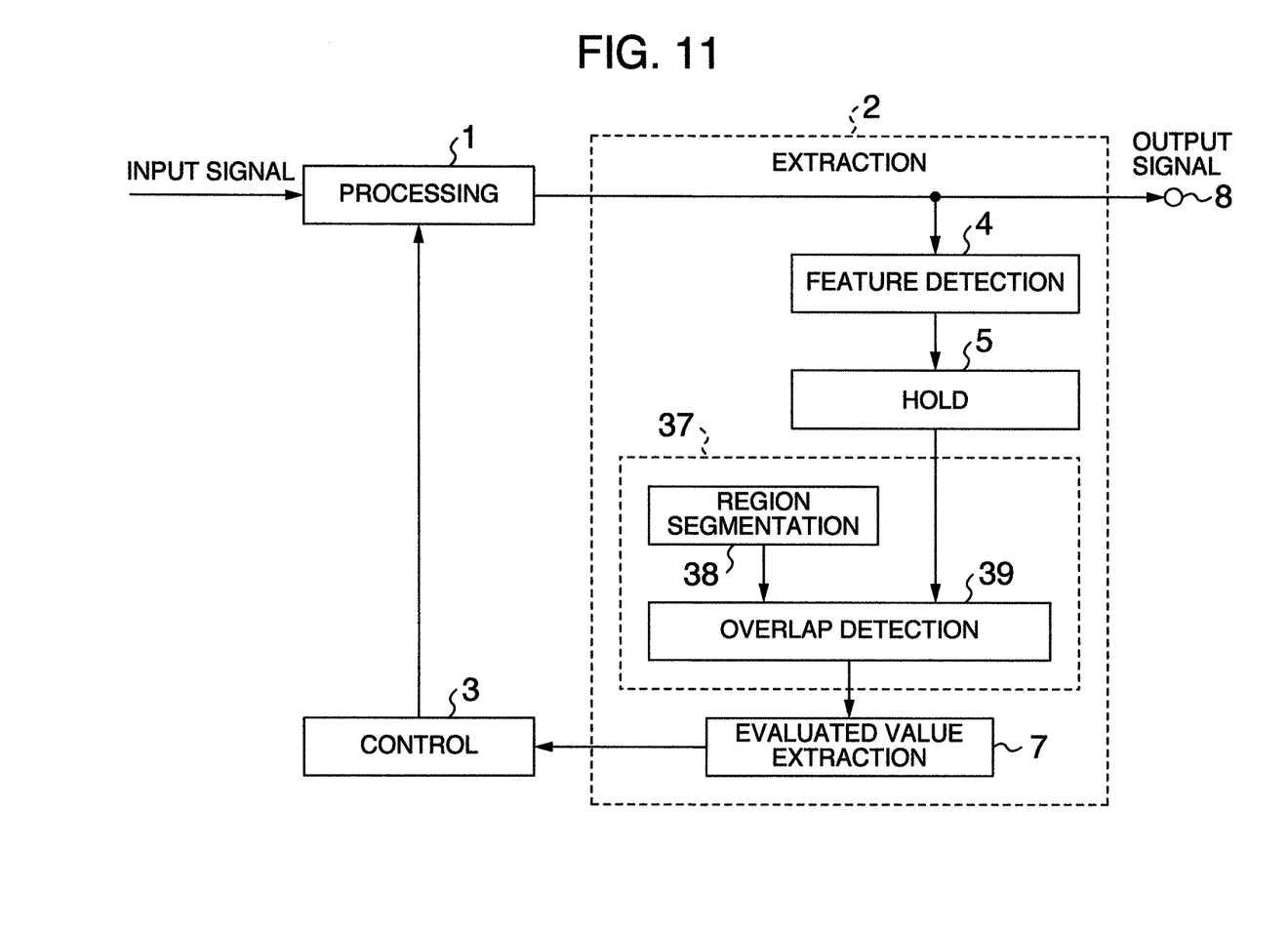
FIG. 11 is a diagram for explaining Embodiment 5.
Figure 12:
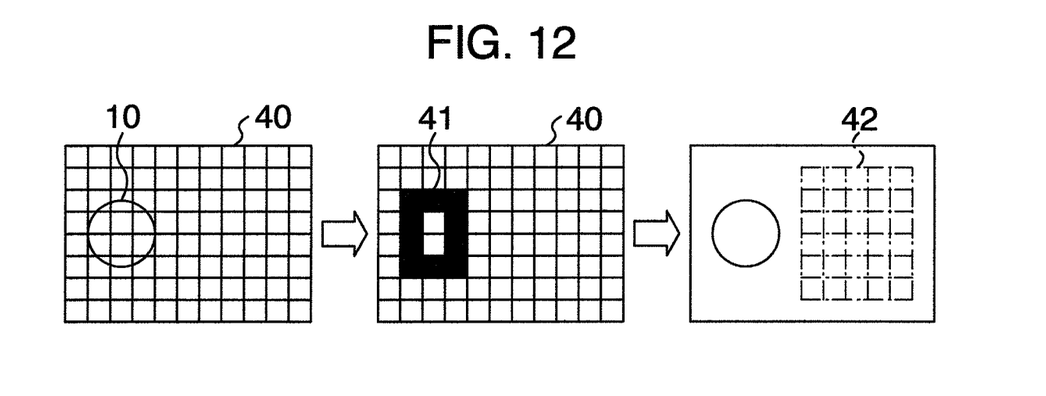
FIG. 12 is a view for explaining the operation of a region creation unit.

Embodiment 5 will be described with reference to FIGS. 11 and 12. FIG. 11 shows an example in which the region creation unit 6 in Embodiment 1 shown in FIG. 1 is replaced by a region creation unit 37 having a region segmentation unit 38 for segmenting an effective region in advance, and an overlap detection unit 39 for detecting overlap of blocks segmented by the region segmentation unit with position information output from the hold unit 5. FIG. 12 is a view for explaining the operation of the region creation unit 37 in this embodiment. In FIG. 12, the reference numeral 40 designates an effective region segmented by the region segmentation unit 38; 41, an overlap position output from the overlap detection unit 39; and 42, an evaluated value extraction region created from blocks segmented by the region segmentation unit 38.

Connection will be described. An output of the hold unit 5 is connected to an input of the overlap detection unit 39. An output of the region segmentation unit 38 is connected to another input of the overlap detection unit 39. An output of the overlap detection unit 39 is connected as an output of the region creation unit 37 to an input of the evaluated value extraction unit 7. Other connections are the same as in Embodiment 1 shown in FIG. 1. Operation will be described. The region segmentation unit 38 segments the effective region as represented by the effective region 40 by using a horizontal counter, a vertical counter, etc. The overlap detection unit 39 detects overlap of the position information held in the hold unit 5 with blocks of the effective region 40 as represented by the overlap position 41 and creates an evaluated value extraction region 42 from blocks by excluding the overlap position 41. The evaluated value extraction unit 7 performs evaluated value extraction in the evaluated value extraction region 42. Other operations are the same as in Embodiment 1 shown in FIG. 1.

By the aforementioned operation, even when there is a spotlight in the effective picture signal, evaluated values not affected by the spotlight can be extracted because the position of the spotlight is excluded from the evaluated value extraction region.

[Embodiment 6]

Figure 13:
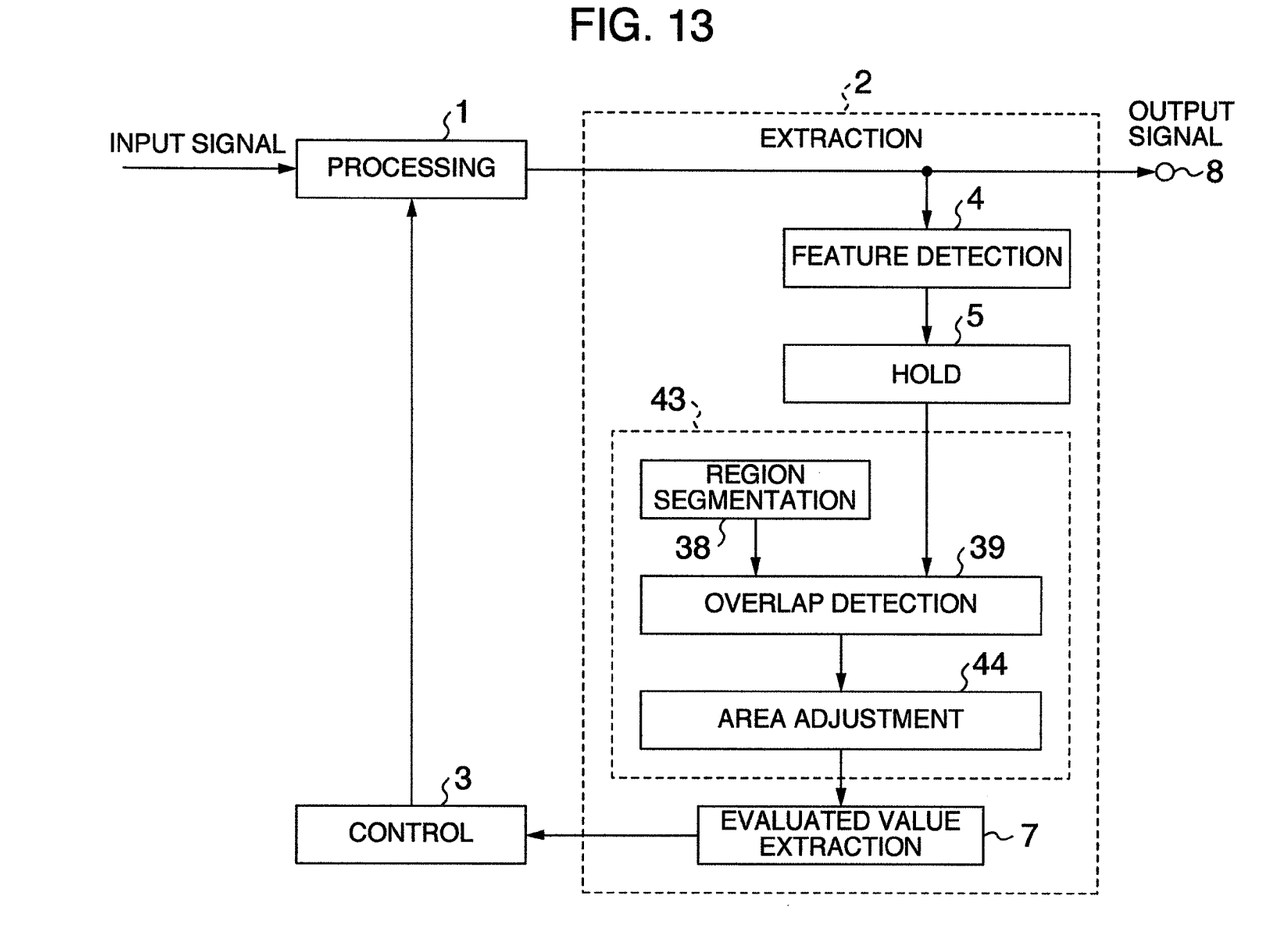
FIG. 13 is a diagram for explaining Embodiment 6.
Figure 14:
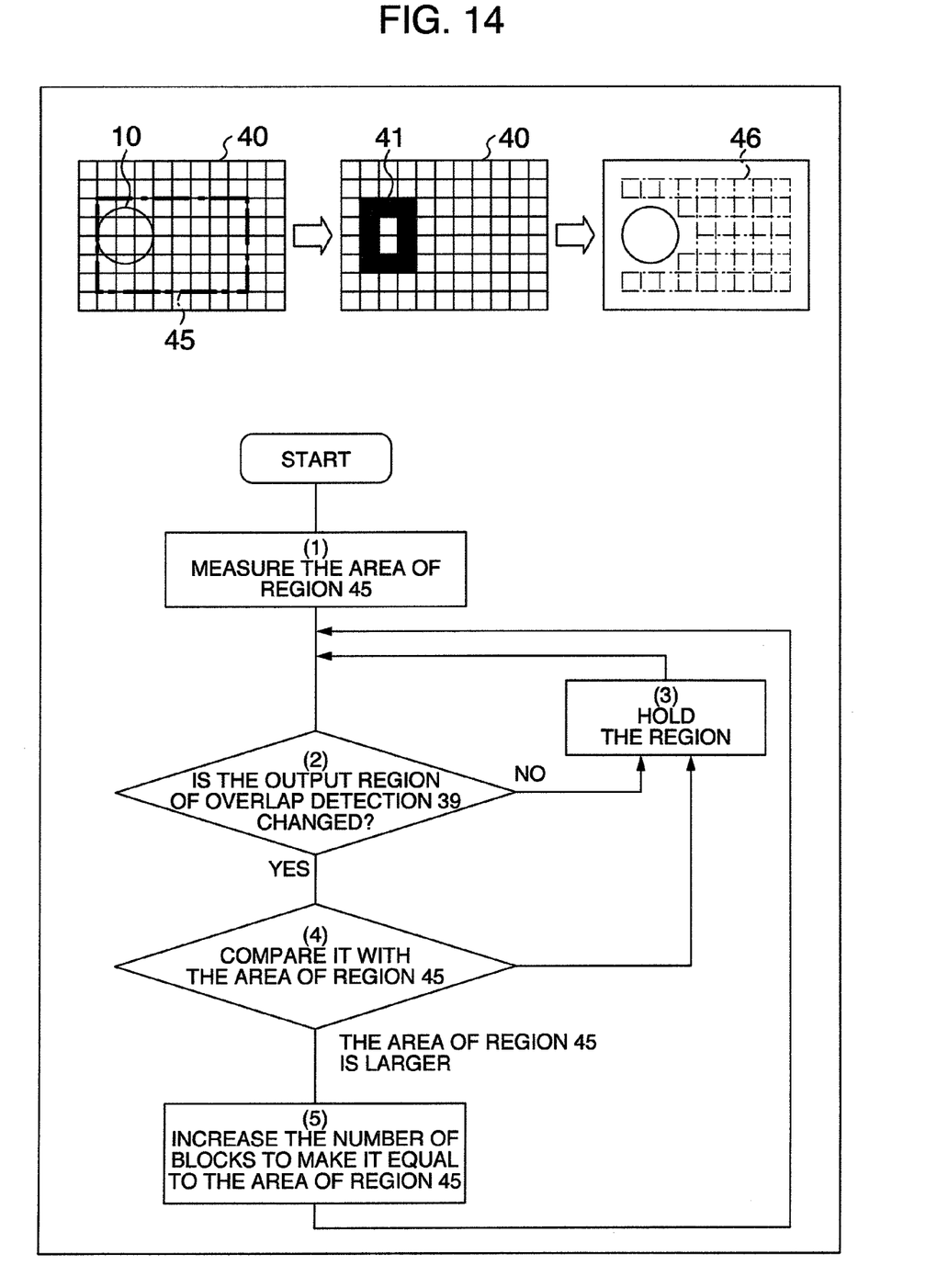
FIG. 14 is a view for explaining the operation of an area adjustment unit.

Embodiment 6 will be described with reference to FIGS. 13 and 14. FIG. 13 shows an example in which the region creation unit 37 in Embodiment 5 shown in FIG. 11 is replaced by a region creation unit 43 having an area adjustment unit 44 for adjusting the evaluated value extraction region to always keep the area of the evaluated value extraction region constant. FIG. 14 is a view and flow chart for explaining the operation of the area adjustment unit 44. In FIG. 14, the reference numeral 45 designates an initial evaluated value extraction region as an evaluated vale extraction region initially set to contain the position of the spotlight 10; and 46, an evaluated value extraction region adjusted by the area adjustment unit 44.

Connection will be described. An output of the hold unit 5 is connected to an input of the overlap detection unit 39. An output of the region segmentation unit 38 is connected to another input of the overlap detection unit 39. An output of the overlap detection unit 39 is connected to an input of the area adjustment unit 44. An output of the area adjustment unit 44 is connected as an output of the region creation unit 43 to an input of the evaluated value extraction unit 7. Other connections are the same as in Embodiment 5 shown in FIG. 11.

Operation will be described. As shown in the flow chart of FIG. 14, the area adjustment unit 44 first grasps the area of the initial evaluated value extraction region 45 by blocks (step 1). Then, the area adjustment unit 44 monitors whether there is any change in the output of the overlap detection unit 39 or not (step 2). When there is no change, the area adjustment unit 44 keeps the area of the extraction region (step 3). When there is any change, the area adjustment unit 44 compares the area of the changed evaluated value extraction region 42 with the area of the initial evaluated value extraction region 45 (step 4). When the areas are equal to each other, the area adjustment unit 44 keeps the area of the extraction region (step 3). When the area of the evaluated value extraction region 42 is smaller, the area adjustment unit 44 performs a process of increasing the number of blocks to make the areas equal to each other (step 5). As a result, a region as represented by the evaluated value extraction region 46 is obtained so that the area of the extraction region is always kept constant.

By the aforementioned operation, even when there is a spotlight in the effective picture signal, evaluated values not affected by the spotlight can be extracted because the position of the spotlight is excluded from the evaluated value extraction region. In addition, there is an effect that the area of the evaluated value extraction region can be kept constant, and that control can be simplified.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A signal processor comprising:
    a feature detection unit which detects a position where features of each pixel of an input picture signal have changed;
    a region creation unit which creates a region by removing pixels with the features from an evaluated value extraction region;
    an evaluated value extraction unit which extracts an evaluated value in accordance with the evaluated value extraction region;
    a processing unit which applies predetermined processing to the picture signal; and
    a control unit which controls the processing unit in accordance with the evaluated value having been extracted by the evaluated value extraction unit;
    wherein the control unit controls the processing unit by using an evaluated value of a region from which pixels having an extracted predetermined feature are removed.

2. A signal processor according to claim 1, wherein the feature detection unit includes:
    a hold unit which holds position information of the detected pixels; and
    the region creation unit which creates a region by excluding the held positions from an evaluated value extraction region.

3. A signal processor according to claim 2, wherein:
    the processing unit includes a focus lens, and a drive unit for driving the focus lens;
    a photoelectric conversion unit for performing photoelectric conversion is disposed between the focus lens and the extraction unit; and
    the control unit controls the processing unit by using an evaluated value of a region from which pixels having an extracted predetermined feature are removed.

4. A signal processor according to claim 2, wherein:
the processing unit is a signal processing unit for adjusting white balance of an input picture signal; and
the control unit controls the processing unit by using an evaluated value of a region from which pixels having an extracted predetermined feature are removed.

5. A signal processor according to claim 2, wherein:
the region creation unit includes a region segmentation unit for segmenting an effective region in advance, and an overlap detection unit which detects overlap of position information output from the hold unit with blocks segmented by the region segmentation unit; and
the control unit controls the processing unit by using an evaluated value of a region from which pixels having an extracted predetermined feature are removed.

6. A signal processor according to claim 2, wherein the region creation unit includes a unit which keeps the total area of the evaluated value extraction region constant by excluding unnecessary portions from the evaluated value extraction region.

7. A signal according to claim 2, wherein:
the processing unit is a light intensity adjustment unit for controlling exposure;
a lens and a photoelectric conversion unit for performing photoelectric conversion are disposed between the light intensity adjustment unit and the extraction unit; and
the control unit controls the processing unit by using an evaluated value of a region from which pixels having an extracted predetermined feature are removed.

8. A signal processor according to claim 7, wherein:
the region creation unit includes a region segmentation unit for segmenting an effective region in advance, and an overlap detection unit which detects overlap of position information output from the hold unit with blocks segmented by the region segmentation unit; and
the control unit controls the processing unit by using an evaluated value of a region from which pixels having an extracted predetermined feature are removed.

9. A signal processor according to claim 7, wherein the region creation unit includes a unit which keeps the total area of the evaluated value extraction region constant by excluding unnecessary portions from the evaluated value extraction region.

10. A signal processor according to claim 1, wherein:
the processing unit is a light intensity adjustment unit for controlling exposure;
a lens and a photoelectric conversion unit for performing photoelectric conversion are disposed between the light intensity adjustment unit and the extraction unit; and
the control unit controls the processing unit by using an evaluated value of a region from which pixels having an extracted predetermined feature are removed.

11. A signal processor according to claim 1, wherein the region creation unit includes a unit which keeps the total area of the evaluated value extraction region constant by excluding unnecessary portions from the evaluated value extraction region.

12. A signal processor according to claim 1, wherein:
the processing unit includes a focus lens, and a drive unit for driving the focus lens;
a photoelectric conversion unit for performing photoelectric conversion is disposed between the focus lens and the extraction unit; and
the control unit controls the processing unit by using an evaluated value of a region from which pixels having an extracted predetermined feature are removed.

13. A signal processor according to claim 12, wherein the region creation unit includes a unit which keeps the total area of the evaluated value extraction region constant by excluding unnecessary portions from the evaluated value extraction region.

14. A signal processor according to claim 1, wherein:
the processing unit is a signal processing unit for adjusting white balance of an input picture signal; and
the control unit controls the processing unit by using an evaluated value of a region from which pixels having an extracted predetermined feature are removed.

15. A signal processor according to claim 14, wherein the region creation unit includes a unit which keeps the total area of the evaluated value extraction region constant by excluding unnecessary portions from the evaluated value extraction region.

* * * * *